United States Patent [19]

Maruyama et al.

[11] Patent Number: 5,489,938
[45] Date of Patent: Feb. 6, 1996

[54] TELEVISION CONFERENCE APPARATUS INCLUDING A MATERIAL PICTURING DEVICE

[75] Inventors: Kyuma Maruyama; Tatsuro Saitoh, both of Atsugi; Masao Kitamura, Souka, all of Japan

[73] Assignee: Ricoh Company, Ltd., Tokyo, Japan

[21] Appl. No.: 426,479

[22] Filed: Apr. 20, 1995

Related U.S. Application Data

[63] Continuation of Ser. No. 881,662, May 12, 1992, abandoned.

[30] Foreign Application Priority Data

May 13, 1991 [JP] Japan ................................ 3-135380
Oct. 11, 1991 [JP] Japan ................................ 3-290473

[51] Int. Cl.$^6$ ........................ H04N 7/15; H04N 5/64
[52] U.S. Cl. ................ 348/15; 348/836; 312/7.2; 312/223.3; 312/316; 49/14
[58] Field of Search ................... ; 312/10, 7.2, 316, 312/223.3; 49/14, 13; 358/400, 408, 435, 479, 14; 348/13, 15, 836, 840; H04N 7/15, 5/64

[56] References Cited

U.S. PATENT DOCUMENTS

| | | | |
|---|---|---|---|
| 2,096,503 | 10/1937 | Allread | 49/13 |
| 2,453,129 | 11/1948 | Hinton | 312/316 |
| 4,258,387 | 3/1981 | Lemelson et al. | 348/14 |
| 4,338,492 | 7/1982 | Snopko | 358/85 |
| 4,576,578 | 3/1986 | Parker et al. | 358/254 |
| 4,825,295 | 4/1989 | Ishikawa et al. | 358/254 |
| 4,888,795 | 12/1989 | Ando et al. | 348/19 |
| 5,142,562 | 8/1992 | Guichard et al. | 358/85 |

FOREIGN PATENT DOCUMENTS 9221211  11/1992  WIPO ........................ H04N 7/14

OTHER PUBLICATIONS

Vidicom Division, "Video Conferencing For Everyone", vol. 9, No. 4, The Business Communications Magazine, Nov. 5, 1990.

*Primary Examiner*—James J. Groody
*Assistant Examiner*—Jeffrey S. Murrell
*Attorney, Agent, or Firm*—Oblon, Spivak, McClelland, Maier, & Neustadt

[57] ABSTRACT

An apparatus for television conference is disclosed which includes a material picturing device and has a minimized overall size. A main camera device taking a picture of a conference, a main monitoring device outputting a picture and voice sound, a voice inputting device, a system controller and a keyboard device for inputting instructions are accommodated inside one cabinet. A manuscript table, for placing an object whose picture is to be sent to other terminals, is provided to the cabinet. A video camera device, which takes a picture of the object, is provided to the cabinet. A lighting device, which lights up the object on the manuscript table is also provided to the cabinet. The manuscript table, video camera device and lighting device are accommodated inside the cabinet when not in use.

14 Claims, 10 Drawing Sheets

FIG. 1 PRIOR ART
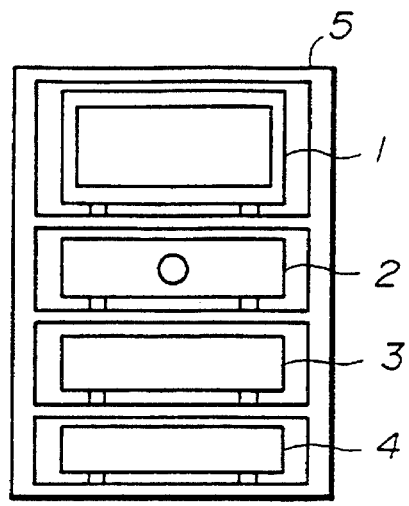
FIG. 2A PRIOR ART
FIG. 2B PRIOR ART
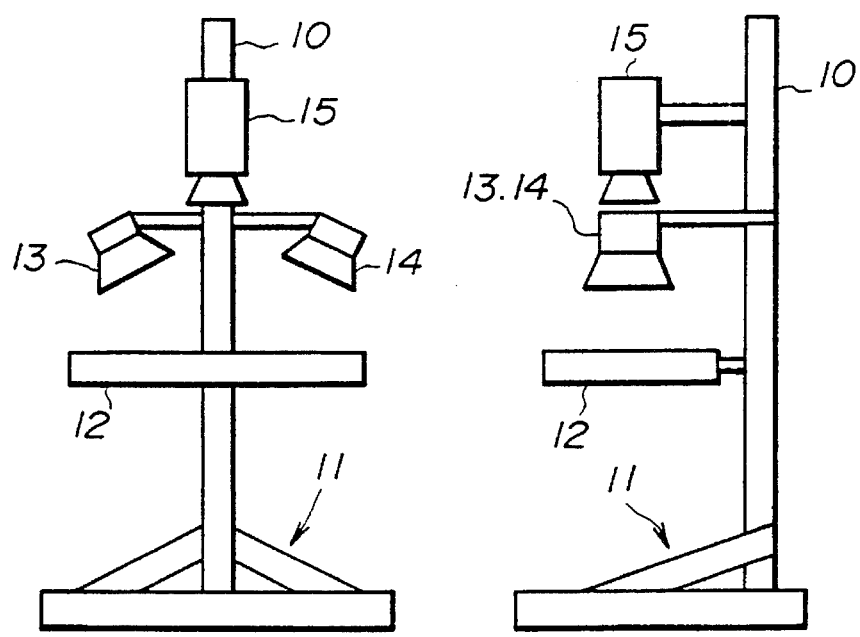

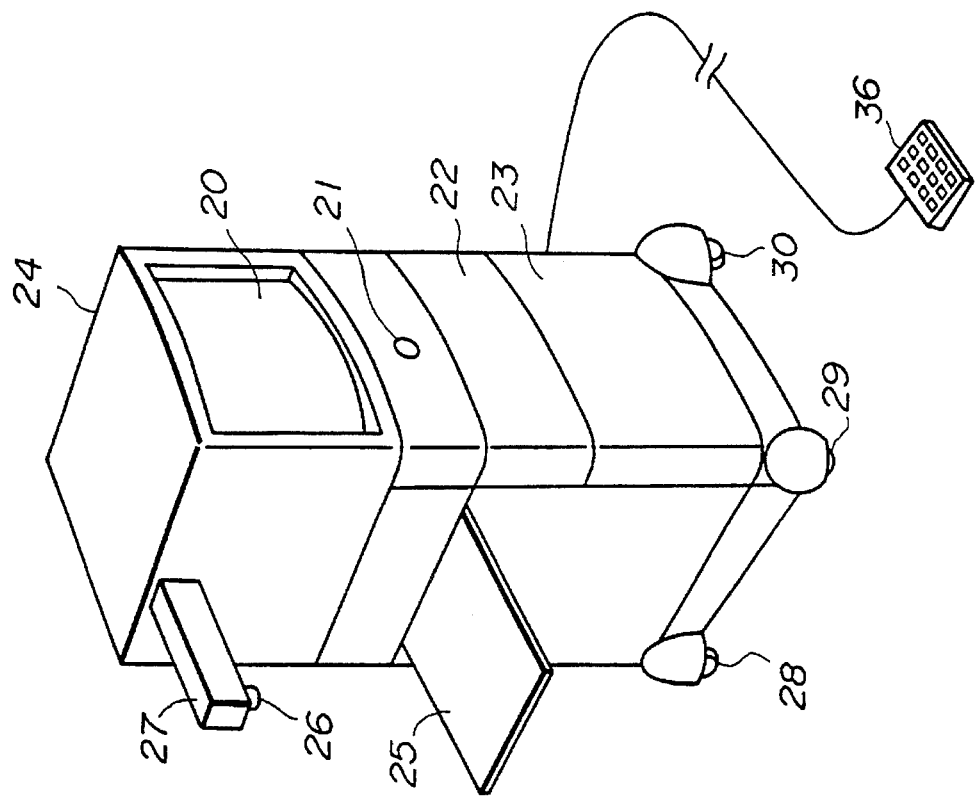
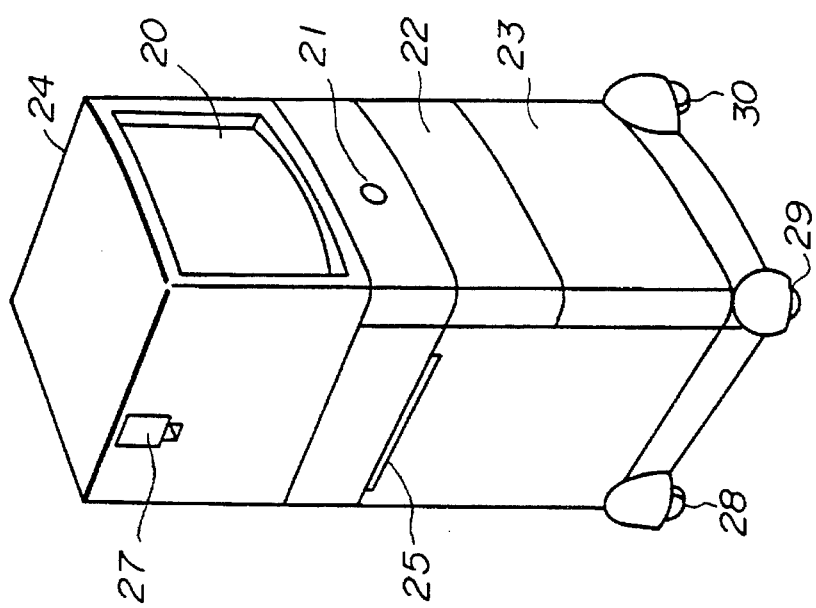

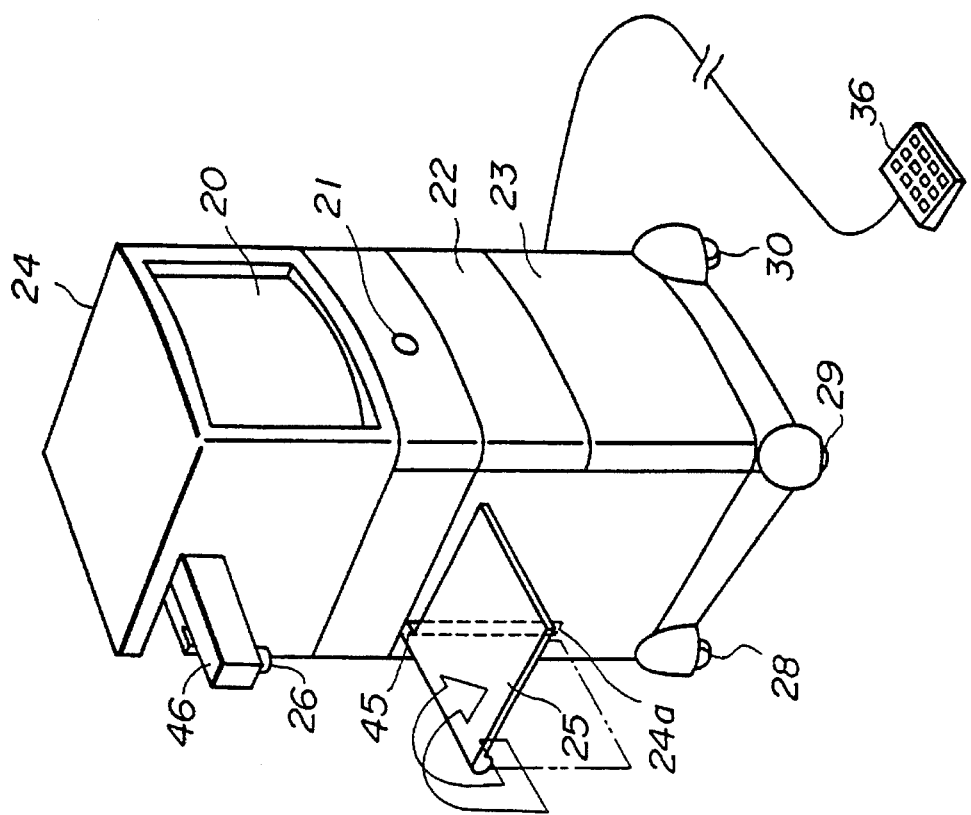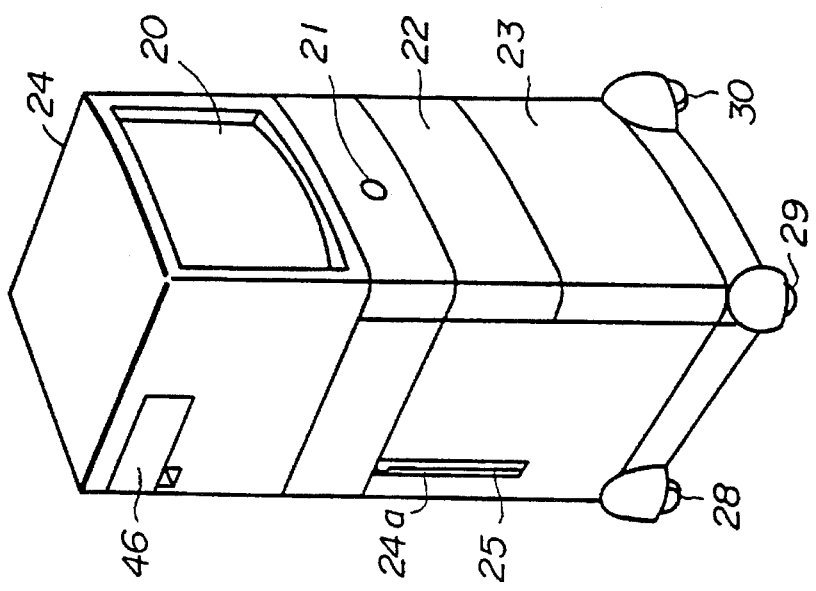

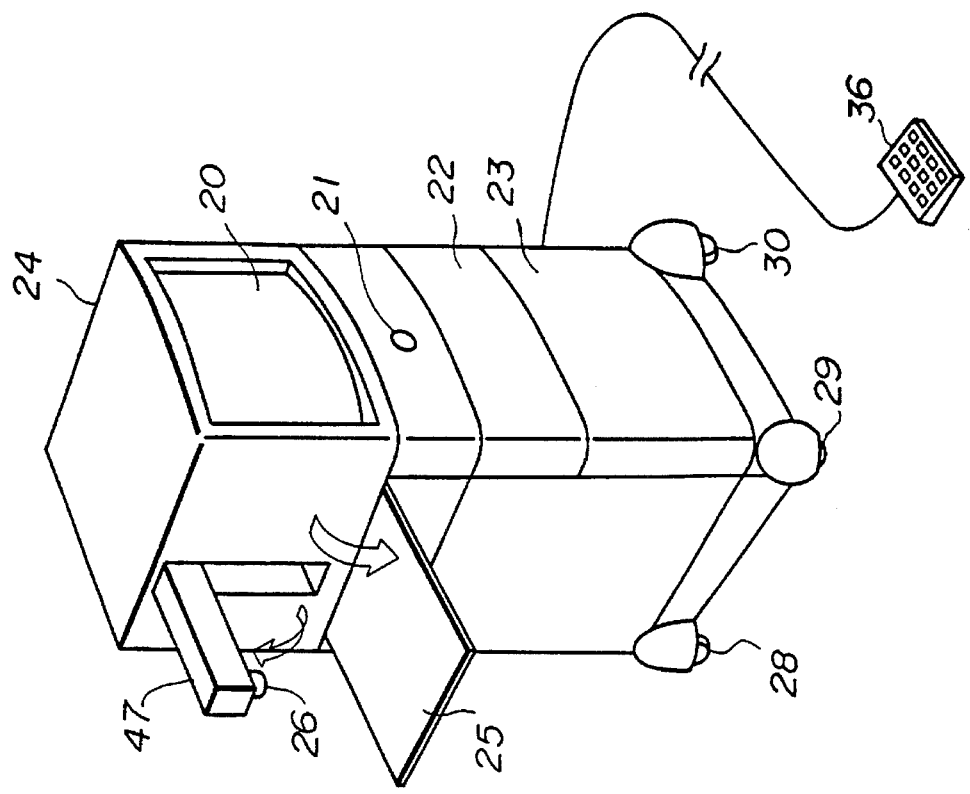
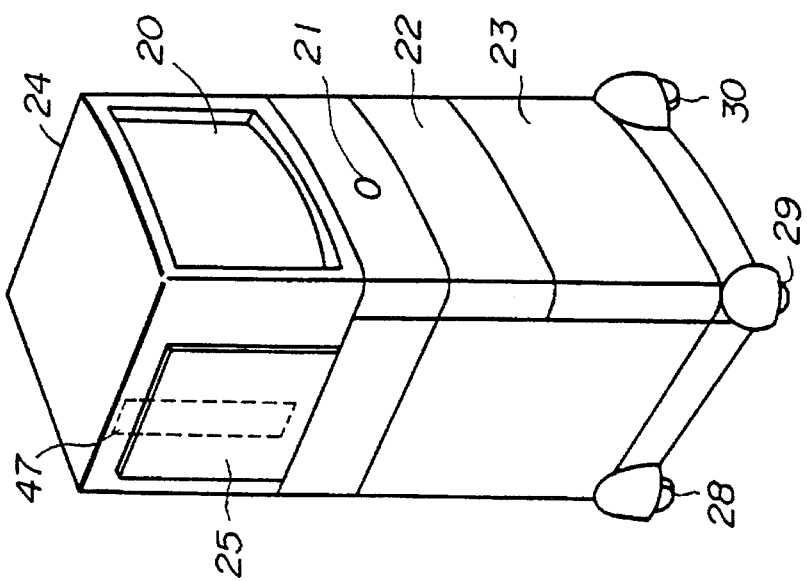

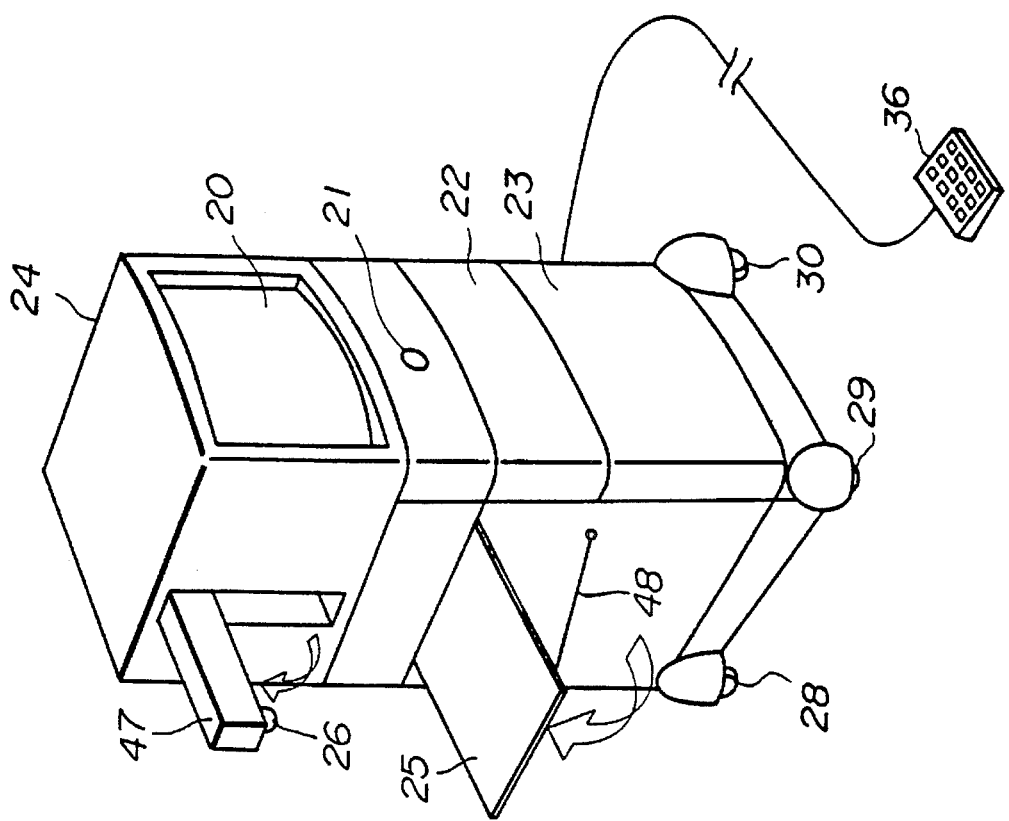
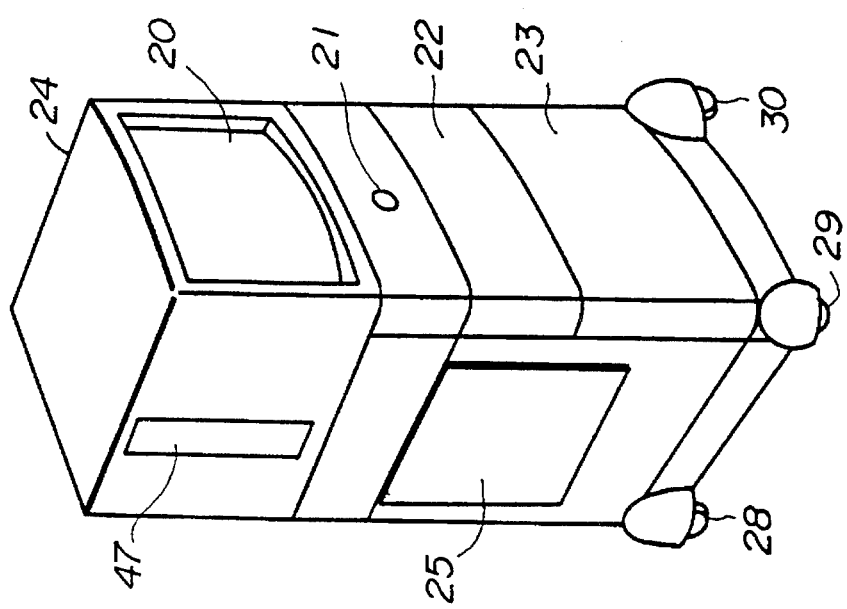

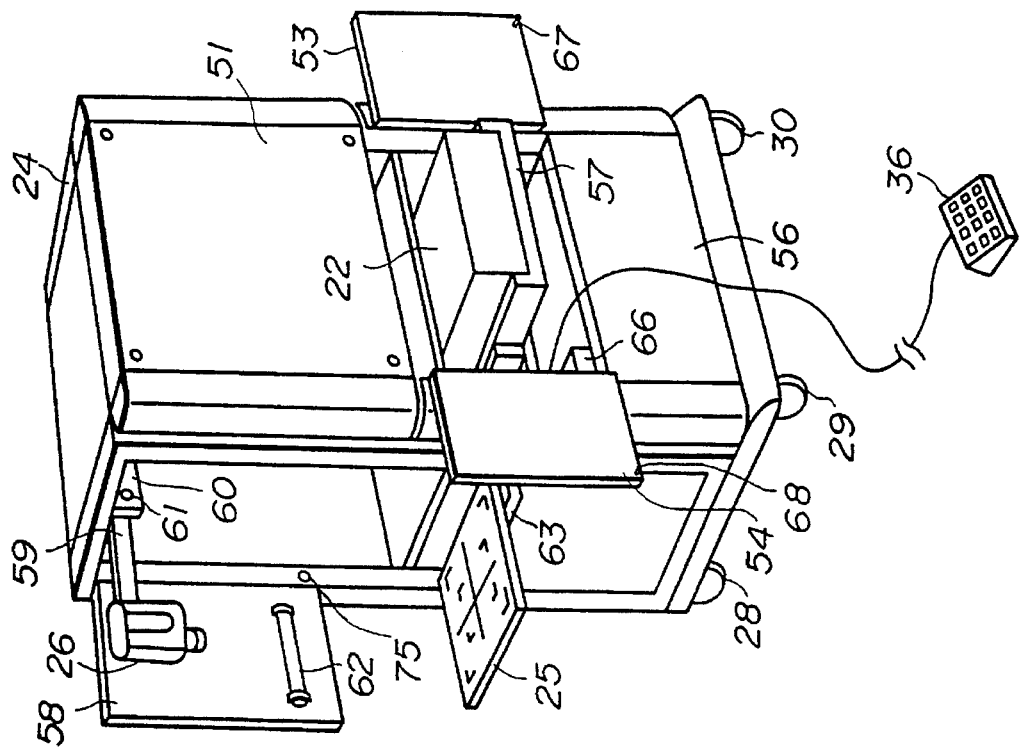
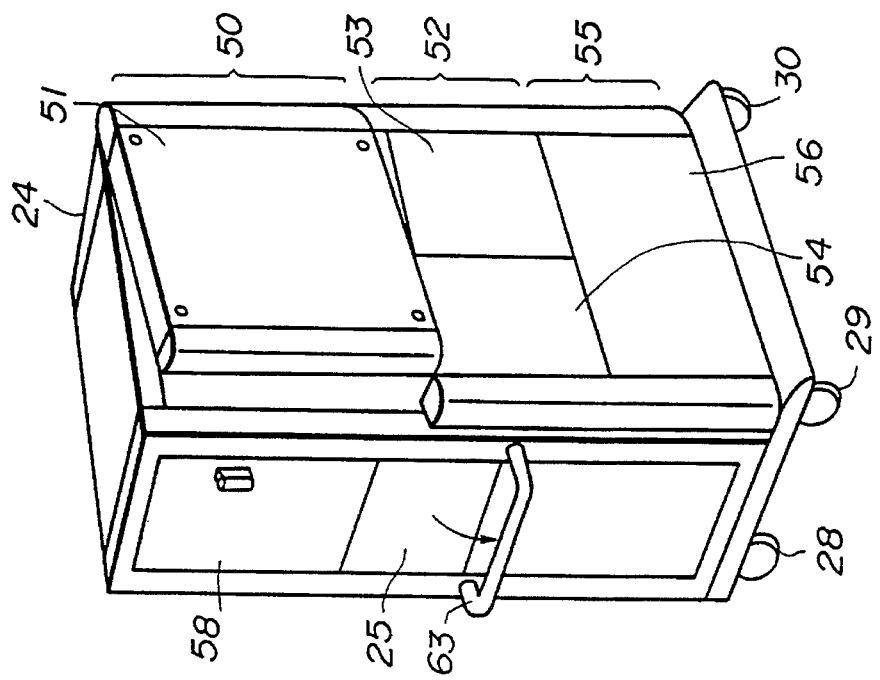

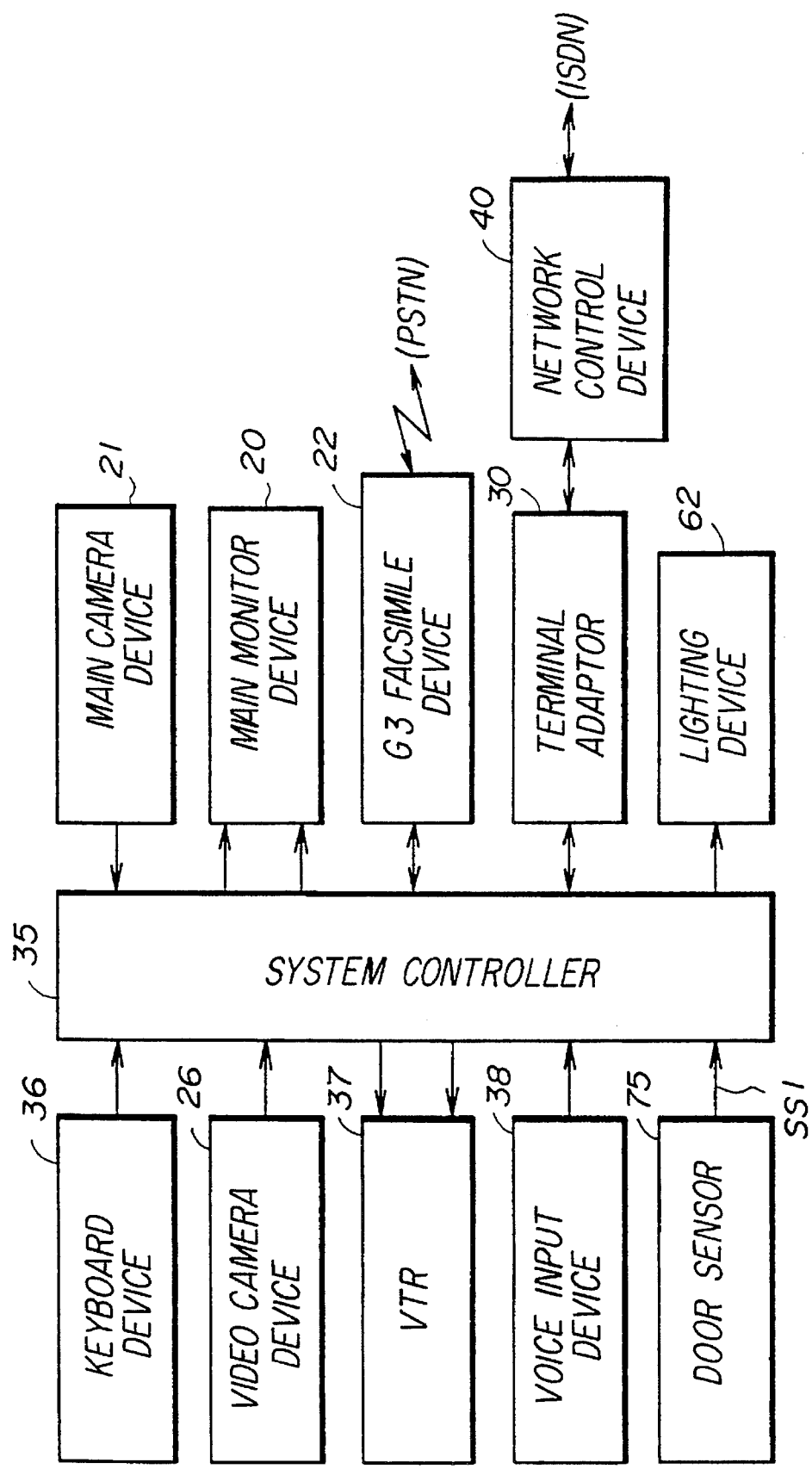

TELEVISION CONFERENCE APPARATUS INCLUDING A MATERIAL PICTURING DEVICE

This application is a continuation of application Ser. No. 07/881,662, filed on May 12, 1992, now abandoned.

BACKGROUND OF THE INVENTION

1. Field of the Invention

The present invention relates to an apparatus for television conference and more particularly to an apparatus which includes a picture monitoring device and other peripheral devices such as a video device.

2. Discussion of the Background

Generally, in a television conference system, a plurality of apparatuses for television conference, hereinafter called apparatus, placed at two or more locations a long distance apart from each other, are connected via ISDN (Integrated Service Digital Network) or digital line. A plurality of attendants can join a conference by using their own terminals.

FIG. 1 shows a conventional apparatus. A main CRT device 1 is provided for displaying an aspect of other terminal attendants. A video device 2 is provided for taking a motion picture of attendants. A data transmission unit 3 is adopted so as to have a plurality of terminals exchanging data reciprocally, through a line. A main unit device 4 is for controling the entire function of the apparatus. These main CRT device 1, video device 2, data transmission unit 3, and main unit device 4 are accommodated in a cabinet 5.

A motion picture of the attendants is obtained by the video device 2 on each of the terminals. The picture data taken by the video device 2 is sent to the other attendance terminal and the motion picture is displayed on the main CRT device 1 of the other attendance terminal. In this way, an aspect of attendants at each terminal is displayed on the main CRT device 1 of the other attendance terminal, reciprocally in real time, thus the conference can be managed smoothly.

Generally in a conference figures and tables prepared beforehand may be displayed with an overhead projector, or a sample, which is the subject of the conference, may be displayed. These performances are made so as to obtain smooth conference management. In order to achieve the same effects in a television conference, a material picturing device is used to display samples, figures or tables in real time. The material picturing device includes, as shown in FIGS. 2A, 2B, a support bar 10, a leg portion 11 to hold the support bar 10, a manuscript table 12 on which a material is placed, lighting devices 13 and 14, a video device 15 to take a picture of the material or samples. The manuscript table 12 is held in the middle of the support bar 10 so as to be parallel to the floor. The lighting devices 13 and 14 are fixed to the support bar 10 in a position higher than that of the manuscript table 12, and light up the material or samples placed on the manuscript table 12. The video device 15 is fixed to the support bar 10 in a position higher than that of the lighting devices 13 and 14, and takes a picture of a material or sample. Accordingly, the picture taken by this material picturing device does not have an undesired shade.

In the above case, the video data obtained by the video device 15 is sent to the other attendance terminal instead of the video data obtained by the video device 2. Then the picture of a material or sample will be displayed on the main CRT device 1 of the other attendance terminal. Therefore, a picture of figures and tables or samples can be presented to attendants of the other terminal side, and thus a smooth management of the conference can be achieved.

However, the construction of the conventional apparatus requires space, in addition to that required for the main cabinet 5, to place the material picturing device. Accordingly, the conventional apparatus has an inconvenience in that it requires a wide space because the entire size of the apparatus becomes large. Furthermore, when moving the apparatus, it is necessary to move the main cabinet 5 and the material picturing device together. Thus there is an inconvenience in that the preparation requires time and labor.

SUMMARY OF THE INVENTION

It is a general object of the present invention to provide an improved apparatus for television conference in which the above-mentioned disadvantages are eliminated.

A more specific object of the present invention is to provide an apparatus that includes a material picturing device and has a minimized overall size.

Another object of the present invention is to provide an apparatus able to accommodate a material picturing device when the material picturing device is not in use, and requiring a minimized placing area.

Another object of the present invention is to provide an apparatus that includes a lighting device for lighting up an object placed on the manuscript table of the material picturing device.

Another object of the present invention is to provide an apparatus that can obtain a picture without undesired shades by employing a ring shaped lighting device when lighting up an object placed on the manuscript table of the material picturing device.

The above-mentioned objects of the present invention are achieved by an apparatus comprising:

a cabinet;

first camera means, accommodated in the cabinet, for generating image data showing images in a conference room;

voice inputting means for generating sound data corresponding to sounds in the conference room;

monitoring means, accommodated in the cabinet, for displaying images based on image data received from a transmission medium and for generating sounds based on sound data supplied therefrom;

a manuscript table provided to the cabinet;

second camera means, provided to the cabinet, for generating image data of a document placed on the manuscript table; and communication means, accommodated in the cabinet and operatively coupled to the first and second camera means and the monitor means, for exchanging the image data and the sound data with the transmission medium.

A lighting device for lighting up the object on the manuscript table may be also provided. The manuscript table, video camera device, and lighting device are accommodated in the cabinet when they are not in use.

Other objects, features, and advantages of the present invention will become more apparent from the following detailed description when read in conjunction with the accompanying drawings.

BRIEF DESCRIPTION OF THE DRAWINGS

FIG. 1 is a front view of a conventional apparatus for television conference;

FIGS. 2A and 2B are front and side views of a conventional material picturing device;

FIGS. 3A and 3B are perspective views of a first embodiment of the present invention. In FIG. 3A the manuscript table and video device are accommodated in the cabinet; in FIG. 3B the manuscript table and video device are pulled out for use;

FIGS. 5A and 5B are perspective views of a second embodiment of the present invention. In FIG. 5A the manuscript table and video device are accommodated in the cabinet; in FIG. 5B the manuscript table and video device are pulled out for use;

FIGS. 6A and 6B are perspective views of a third embodiment of the present invention. In FIG. 6A the manuscript table and video device are accommodated in the cabinet; in FIG. 6B the manuscript table and video device are pulled out for use;

FIGS. 7A and 7B are perspective views of a fourth embodiment of the present invention. In FIG. 7A the manuscript table and video device are accommodated in the cabinet; in FIG. 7B the manuscript table and video device are pulled out for use;

FIGS. 8A and 8B are perspective view of a fifth embodiment of the present invention. In FIG. 8A the manuscript table and video device are accommodated in the cabinet; in FIG. 8B the manuscript table and video device are pulled out for use;

FIG. 9A is a plane view of the doors 53 and 54 in closed position; FIG. 9B is a partial perspective view of the spacers 72 and 73;

FIG. 10 is a schematic block diagram of a control system in the fifth embodiment of the present invention;

DESCRIPTION OF THE PREFERRED EMBODIMENTS

Figure 4:
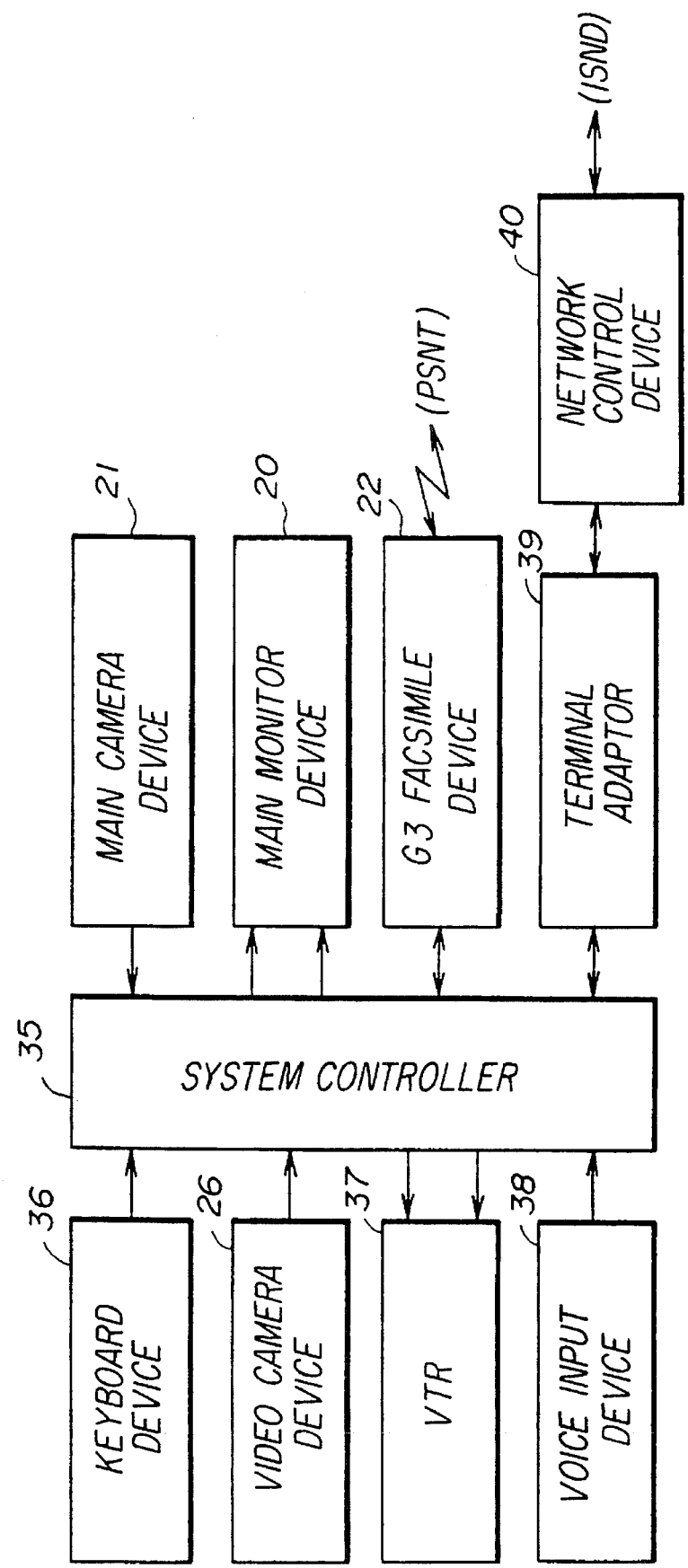
FIG. 4 is a schematic block diagram of a control system in the first embodiment of the present invention.

Referring to FIGS. 8A and 8B, which show a first embodiment of the present invention, a main monitor device 20 is provided as a monitor means for displaying an aspect of the other terminal attendants, and a main camera device 21 is a first camera means, for taking a picture of attendants. A group 3 facsimile device 22 transmits and receives picture data, which is image data, for printed materials not in real time. A main unit device 23, as a communication means, controls an entire operation of the apparatus for television conference, and exchanges data between terminals. These main monitor device 20, main camera device 21, group 3 facsimile device 22, and main unit device 23 are put in a single cabinet 24. Other devices such as a keyboard device 36, an external input device, or a video tape recorder device can be accommodated in the portions where a group 3 facsimile device 22 and a main unit device are placed.

A manuscript table for placing materials and samples is provided on one side of the cabinet 24 and it can be retracted into the cabinet 24. A video camera device 26 is attached, as a second camera means, to one end of an arm member 27, which arm can be retracted inside the cabinet 24, and positioned above the table 25. This video camera device 26 takes a picture of a printed material or a sample placed on the table 25 and sends the picture data, which is image data, to the main unit device 23. On each corner of the bottom of the cabinet 24, there are provided four wheels 28,29,30,31 with locking means, for moving the cabinet 24 smoothly (wheel 31 is not seen in FIGS. 3A and 3B).

Accordingly, a material picturing device like the conventional ones can be set up by pulling out the table 25 and arm member 17 from the cabinet 24 and having the video camera 26 in operation. However, in this case, a printed material or a sample placed on the table 25 is lighted up by a lighting device in the room.

As mentioned above, the first embodiment of the present invention can reduce the floor space necessary for an apparatus for television conference by providing to the cabinet 24 a material picturing device necessary for the television conference. In addition, since the apparatus for television conference including a material picturing device can be moved as a single apparatus, time and labor necessary for transportation can be reduced. Furthermore, the cabinet 24 has the wheels 28,29,30,31 on the bottom, allowing a simple operation to move the apparatus for television conference. Since the cabinet 24 can be made stationary by locking these wheels at the point of usage, the states are eliminated wherein a printed material or a sample on the table 25 become unstable, or the picture taken by the video camera 26 becomes unstable.

FIG. 4 shows a schematic block diagram of a control system in the first embodiment of the present invention. A group 3 facsimile device and a video tape recorder device are connected to a system controller 35 as additional functioning units. The system controller 35 controls an entire operation of the apparatus for television conference. Additionally, the system controller 35 also controls a main monitor device 20, main camera device 21, group 3 facsimile device 22, video camera device 26, and other devices which can be connected thereto. A keyboard device 36 functions to input instructions for operating the apparatus. A video tape recorder device (VTR) 37 is provided for recording a picture, and a voice inputting device 38 is for inputting voice sound of attendants. A terminal adaptor 39 converts data received or to be transmitted into a format which can be transmitted through ISDN, and executes a call procedure for ISDN. A network control terminal device 40 connects the apparatus to ISDN. In the first embodiment of the present invention, a group 3 facsimile is connected to a public service telephone network (PSTN) independently.

Furthermore, the system controller 35, as communication means, changes the data to the appropriate format to input to the main monitor device 20, main camera device 21, video camera device 26 video tape recorder device 37, and voice inputting device 38, and also has a function (CODEC function) to change the data output from these devices to a readable format.

When holding a television conference by using this apparatus, an operator of the apparatus or a steering committee takes the keyboard 36, which is the input means, out of the apparatus, and places it on the desk so as to operate to call the other attendance terminal. Through this operation, a call procedure with ISDN is executed, and an information channel is established, for data transmission to the other attendance terminal. Then a picture and voice are exchanged between a first attendance terminal and other attendance terminals by using a main camera device 21 and a voice input device 38. In other words, the picture taken by the main camera 21 of the other attendance terminal is displayed on the main monitor device 20 of a first attendance terminal, and the voice input to the voice inputting device 38 of the other attendance terminal is output from the main monitor of the first terminal, and vice versa. In this way, a television conference proceeds.

When sending a picture of a printed material, operating a group 8 facsimile device 22 independently and sending the image of the material to the facsimile device 22 of the other attendance terminal, the operation of the facsimile device may be controled by the keyboard device 36.

On the other hand, when a picture of figures, tables, or samples is required to be sent in real time, the picture data, which is image data, taken by a video camera device 26 is sent to the other attendance terminal by switching the video device from the main camera device 21 to the video camera device 26, by operating the keyboard device 36. If the manuscript table 25 and the arm member 17 are pulled out, and the video camera device 26 is set for operation beforehand, the operation for switching from the main camera device 21 to the video camera device 26 can be done immediately.

In this manner, the picture of the conference room and the picture of the material or the sample can be selectively sent to the opponent terminal, and thus the conference proceeds efficiently.

FIGS. 5A and 5B show a perspective view of a second embodiment of the present invention. In FIGS. 5A and 5B, those parts that are the same as corresponding parts in FIGS. 3A and 3B are designated by the same reference numerals, and descriptions thereof will be omitted. One side of a table 25 is fixed to a bar member 45, which is rotatably supported and retractable to an inside of a cabinet 24. The portion of the cabinet 24 where the bar member 45 is accommodated also has a longitudinal slit 24 for accommodating the table 25. When putting the table 25 inside the cabinet 24, the table 25 is turned to the upright position where it can be retracted to inside the slit 24a, then the table 25 is pushed towards the slit 24a. A video camera device 26 is fixed to a rotatably supported arm member 46 which can be accommodated inside the cabinet 24.

When using the table 25, the table 25 is pulled out from the slit 24a, then turned until it reaches a horizontal position. A support member (not shown in FIGS. 5A and 5B) for maintaining the horizontal position of the table 25 is provided to the table 25. In order to have a video camera device 26 in operation, the arm member 46 is pulled out from the cabinet 24 by turning it outwardly from the cabinet 24. To return the table 25 and video camera device 26 to a "not in use" position, the above mentioned operation is executed in reverse order.

In the second embodiment mentioned above, since the table 25 is placed on the back side of the cabinet 24, the height of the cabinet 24 is reduced, and the overall size of the cabinet is also reduced.

FIGS. 6A and 6B are perspective views of a third embodiment of the present invention. In FIGS. 6A and 6B, those parts that are the same as corresponding parts in FIGS. 5A and 5B are designated by the same reference numerals, and descriptions thereof will be omitted. An arm member 47, supporting video camera device 26 at one end, is fixed to the cabinet 24 in the state where the other end of the arm member 47 is pivotally connected to the upper side of the cabinet 24, and can be accommodated inside the cabinet 24.

A table 25 is attached rotatably about the lower side thereof and accommodated on the side of the cabinet by overlapping it with the arm member 47 in the accommodated position. Accordingly, when taking a picture by using the video camera device 26, the table 25 is turned until it reaches a horizontal position. Then the arm member 47 is pulled out from the cabinet 24. In this state, a picture of a printed material or a sample on the table 25 can be taken by using the video camera device 26. In FIGS. 6A and 6B, a supporting member supporting the table 25 in the horizontal position is not shown.

FIGS. 7A and 7B are perspective views of a fourth embodiment of the present invention. In FIGS. 7A and 7B, those parts that are the same as corresponding parts in FIGS. 6A and 6B are designated by the same reference numerals, and descriptions thereof will be omitted. A table 25 is rotatably attached to the cabinet 24 at one side thereof, and is turned downwardly to be placed on the side of the cabinet 24 when not in use. When taking a picture by using a video camera device 26, the table 25 is turned until it reaches a horizontal position, then is held in place by a bar member 48 provided on a back face of the table 25. Next, an arm member 47 is pulled out from the cabinet 24, and the video camera device 26 in placed in the operating position.

In the fourth embodiment mentioned above, while a video camera device is fixed to an arm member, alternatively however, a video camera device may be detachably connected to the arm member. In this case, a supporting member for a video camera device will be provided to the arm member. In this manner, total cost of the apparatus will be reduced because a commercially available video camera for home use can be employed as a video camera device. In addition, although lighting devices are not provided to the embodiment mentioned above, a lighting device can be attached to the arm member holding the video camera device when the light is not sufficient for taking a picture.

FIGS. 8A and 8B are perspective views of a fifth embodiment of the present invention. In FIGS. 8A and 8B, those parts that are the same as corresponding parts in FIGS. 7A and 7B are designated by the same reference numerals, and descriptions thereof will be omitted. A cabinet 24 is divided into three portions, vertically. There is provided, the uppermost cell 50, a door 51 made, for example, of transparent materials such as a glass. Center opening doors 53,54 are provided to the middle cell 52, and a door 56 is provided to the lowermost cell 55. A main monitor device 20 and a main camera device 21 are placed in the cell 50 (neither device is shown in FIGS. 7A and 7B). The cell 55 contains a main unit device 23 and other devices. In the cell 52, there is provided an extensible shelf 57. A group 3 facsimile device 22 having an operation area on the top face is placed on the shelf 57.

A door 58 for a material picturing device is provided in the upper portion of the side face of the cabinet 24. A table 25 is provided under the door 58; one of the sides of the table 25 is rotatably connected to the cabinet 24. The upper side of the table 25 makes contact with the lower side of the door 58 in the position where the table 25 is retracted to inside the cabinet. A video camera device 26 fixed to an arm member 59 is positioned inside the cell 50. This arm member 59 is fixed with a manually operated screw 61 to a support member 60 positioned inside the cabinet 24. A line-type lighting device 62 is provided, as lighting means, on the back side of the door 58.

On one side of the cabinet 24, there is provided a handle member 63, which helps in moving the cabinet 24, and on the other side of the cabinet 24, a handle member 64 is also provided. By holding these handle members 63 and 64, the apparatus can be carried easily and safely. The handle member 63 also functions as a supporting member to hold the table 25 at the horizontal position when the table 25 is laid down. Additionally, the handle members 63,64 may be used for hooking cables while the cabinet 24 is being moved.

A receptacle equipped with a switch 66 placed inside the cell 52 is for providing electricity to the devices of the apparatus, and allows those devices to be turned on and off all together. Protrusions 67,68 are provided to the lower side of the back face of the doors 53,54, and these contact with latch members (to be described in the following) when the doors 53,54 are closed.

In the back side of the shelf 57, there are provided some reels for winding cables such as a power supply cable and a telephone line connected to the devices in the cabinet 24. Accordingly, those cables are not caught by moving parts of the shelf 57 while the shelf 57 is being moved.

In the state where the door 58 and the table 25 is closed, the door 58 holds the table 25, and thus unexpected opening of the table 25 is prevented.

In addition, since each device in the cabinet 24 is turned on and off simultaneously by the receptacle 66, labor and time spent in these chores is reduced significantly.

Since devices to be used outside the cabinet 24 can be placed on the extensible shelf 57, operation of the devices such as a facsimile device 22 becomes very convenient.

Since the arm member 59 holding the video camera device 26 is fastened to the support member 60 with the screw 61, the drawn length and the angle of the arm member 59 can be freely changed, thus the video camera device 26 can be fixed in a preferred position.

Figure 9A:
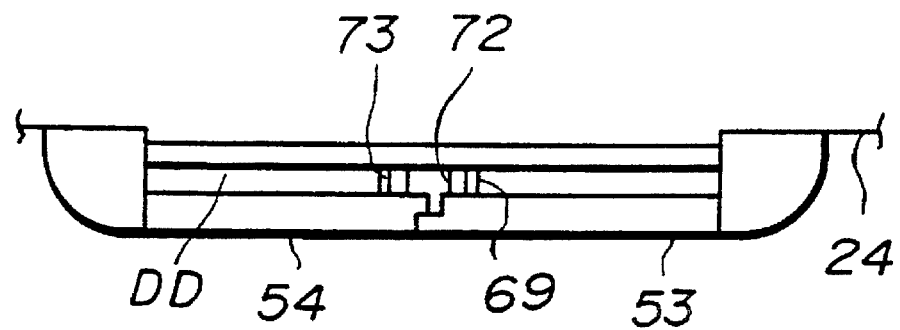
FIGS. 9A and 9B are partial views for explaining mounting of the doors 53 and 54 in the fifth embodiment of the present invention.
Figure 9B:
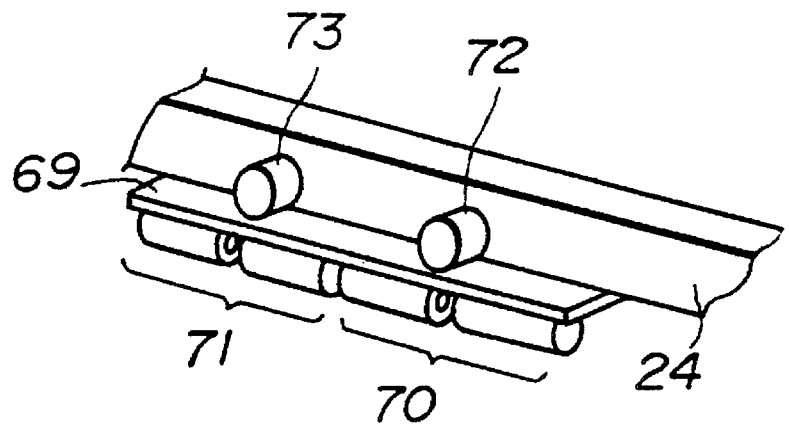

FIGS. 9A and 9B show partial views for explaining mounting of the door 53 and 54 in the fifth embodiment of the present invention. Latch members 70,71, fixed to a fixing plate 69, are provided to the lower edge of the cell 52. These latch members are for holding the protrusions 67,68 on the doors 53,54 when the doors are closed. Spacers 72,73, of an elastic material such as rubber, are provided above the latch members 70,71 to receive the doors 53,54. Accordingly, when the doors 53,54 are closed, an opening DD is formed between the doors 53,54 and the lower edge of the cell 52. The cable connected to the facsimile device 22 can go through the opening DD; this allows the facsimile device 22 to be taken out and placed on the desk beside the cabinet 24, and to then the doors 53,54 and maintain them closed. Thus, the space necessary for using the apparatus is reduced.

FIG. 10 shows a schematic block diagram of a control system in the fifth embodiment of the present invention. In FIG. 10, those parts that are the same as corresponding parts in FIG. 4 are designated by the same reference numerals, and descriptions thereof will be omitted. A door sensor 75, as detecting means, detects opening of the door 58. The detection signal SS1 is sent to a system controller 35, and the lighting device 62 is turned on and off according to the signal SS1.

When it is required to send a picture of figures, tables or samples in real time, during the television conference, using the fifth embodiment mentioned above, a picture taken by the video camera device 26 is sent to the opponent terminal by switching the video device, from the main camera device 21 to the video camera device 26, by operating the keyboard device 36. In order to do that, the door 58 is opened and then the table 25 is pulled down to the horizontal position in which it is supported. Then, the video camera device 26 is set to the position where a picture of an appropriate area of the table 25 is taken by the video camera device 26, by moving the arm member 59 by loosening the screw 61, and then fixing the arm member to the proper position by tightening the screw 61. When the door 58 is open, the signal SS1 is output from the door sensor 75, and according to the signal, the system controller turns on the lighting device 62 positioned on the back face of the door 58. In this manner, since the lighting device is automatically turned on by opening the door 58, operator labor and time spent in preparations can be saved. Moreover the object on the table 25 is lighted up by the lighting device 62, which thus allows the video camera device 26 to take a clear picture. Furthermore, when the door 58 is closed after finishing operations, the output of signal SS1 from the door sensor 75 stops, and thus the system controller 35 turns the lighting device 62 off. As mentioned above, because the lighting device 62 is turned on and off by an opening and closing operation of the the door 58, operator labor is reduced, and the operation for use of the video camera device 26 is improved.

Figures 11A, 11B:
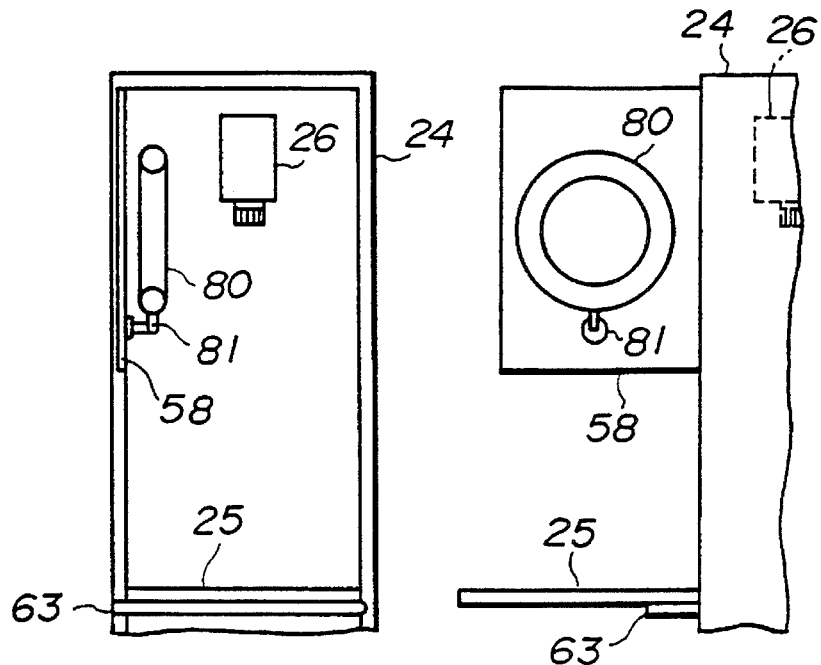
FIGS. 11A and 11B are partial views of the fifth embodiment of the present invention for explaining the lighting device 80 in the "not in use" position.
Figures 12A, 12B:
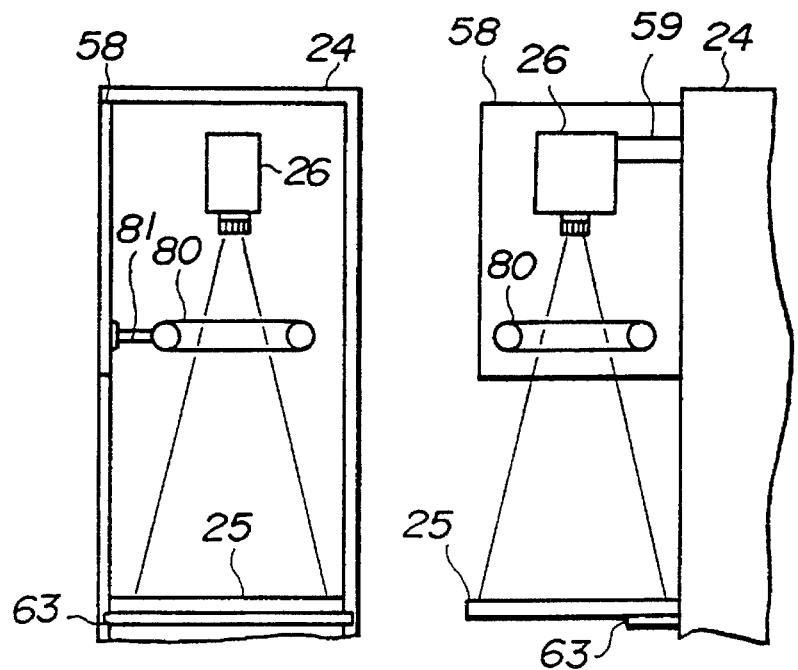
FIGS. 12A and 12B are partial views of the fifth embodiment of the present invention for explaining the lighting device 80 in the "in use" position.

In the embodiment mentioned above, a line-type lighting device is provided on the back face of the door 58, however, using this type of lighting devices forms a shade on the object placed on the table 25. FIGS. 11A, 11B, 12A and 12B show a ring-type lighting device 80 able to eliminate this problem. A ring-type lighting device 80 is provided on the back face of the door 58 via a linkage member 81. This linkage member 81 can hold the lighting device 80 in a position either parallel or perpendicular to the back face of the door 58. When a picture is not being taken by the video camera device 26, as shown in FIGS. 11A, 11B, the lighting device 80 is held parallel to the back face of the door 58. When the door 58 is open and the video camera device is to be in operation, as shown in FIGS. 12A, 12B, the lighting device 80 is positioned to be perpendicular to the back face of the door 58. This ring-type lighting device 80 can emit light from a wide area above the table 25. In this way, an object placed on the table 25 can be lit without undesired shade. In this case, it is necessary that the lighting device 80 does not appear in a picture taken by the video camera device 26. Therefore, the distance between the lighting device 80 and the video camera device 26 is determined so that the angle of the photographed area is smaller than the angle formed by the video camera device 26 and the inner side of the ring type lighting device 80. As mentioned above, in this embodiment, a picture taken by the video camera device 26 does not have undesired shade, and thus a clear picture of an object on the table 25 can be obtained.

There is also a case where all of the attendants of a television conference cannot understand the same language, in a conference wherein attendants are of mixed nationalities, for example. In such a case, the conference proceeds with an interpreter. An automatic translation device that substitutes for an interpreter may be added to the apparatus for television conference of the present invention.

The present invention is not limited to the specifically disclosed embodiments, and variations may be made without departing from the scope of the present invention.

What is claimed is:

1. An apparatus for television conference comprising:
    a cabinet comprising a plurality of compartments each accommodating one of a plurality of devices necessary for performing said television conference, said compartments being piled up so that said cabinet occupies a small space;
    a manuscript table, provided to said cabinet, having a table top on which an object is placed, said manuscript table being positioned against said cabinet at either one of a first position and a second position, said table top of said manuscript table being in a closed state against said cabinet when said manuscript table is at said first position, said table top of said manuscript table being in an opened state against said cabinet when said manuscript table is at said second position; and a handle member being fixed on said cabinet in a position under said manuscript table so as to help move said cabinet, said handle member supporting said manuscript table when said manuscript table is at said second position so that said table top of said manuscript table is positioned in a horizontal state; and an arm member, movably provided on said cabinet, having camera means for generating image data of an object placed on said manuscript table, said arm member enabling said camera means to be positioned either inside said cabinet, or outside said cabinet directly above said manuscript table when said manuscript table is at said second position, said manuscript table being positioned under said arm member.

2. An apparatus for television conference as claimed in claim 1, wherein said manuscript table is accommodated inside said cabinet when said manuscript table is at said first position, or said manuscript table is accommodated outside said cabinet when said manuscript table is at said second position, said object being placed on said table top when said manuscript table is at said second position.

3. An apparatus for television conference as claimed in claim 2, wherein a bar member is rotatably and slidably supported in said cabinet and one of the sides of said manuscript table is fixed to said bar member, and said manuscript table can be in a position either accommodated inside a slit formed longitudinally on the side face of said cabinet, or outside said cabinet where said object is placed thereon.

4. An apparatus for television conference as claimed in claim 1, wherein a sliding mechanism is provided to said manuscript table so that said manuscript table can be in a position either accommodated inside said cabinet or outside said cabinet where said object is placed thereon.

5. An apparatus as claimed in claim 1, wherein said camera means is fixed to one end of said arm member, said arm member horizontally pivoting about the other end thereof so that said camera means is positioned either inside said cabinet, or outside said cabinet directly above said object.

6. An apparatus for television conference as claimed in claim 1, wherein said manuscript table is pivotally provided to a side of said cabinet, said manuscript table being placed in a position either accommodated inside said cabinet when said cabinet is at said first position, or outside said cabinet when said manuscript table is at said second position, said object being placed on said table top when said manuscript table is at said second position.

7. An apparatus as claimed in claim 1, wherein said camera means is fixed to one end of said arm member, said arm member vertically pivoting about the other end thereof so that said camera means is positioned either in said cabinet, or outside said cabinet directly above said object.

8. An apparatus for television conference as claimed in claim 1, wherein said cabinet includes a door for opening said cabinet when placing or removing a device, and wherein an opening is formed between the front face of said cabinet and said door, through which cables connect said device to devices placed inside said cabinet.

9. An apparatus for television conference as claimed in claim 1, wherein lighting means is provided, for lighting said object placed on said manuscript table.

10. An apparatus for television conference as claimed in claim 9, wherein said lighting means are provided to the back face of a door which opens a portion of said cabinet where said camera means is accommodated, and said lighting means may be placed in a position to light up said manuscript table in the state where said door is open, and is accommodated inside the cabinet in a state where said door is closed.

11. An apparatus for television conference as claimed in claim 10, further comprising control means for controlling switching on/off of said lighting means, and wherein said cabinet has detection means for detecting an opening of said door and sending a signal to said control means so that said control means turns on said lighting means based on the signal supplied by said detection means.

12. An apparatus for television conference as claimed in claim 11, wherein said lighting means comprises a ring shaped lighting device located between said camera means and said manuscript table and lighting up uniformly, an entire face of said manuscript table from above, and said camera means takes a picture of said object placed on said manuscript table through the center of said ring shaped lighting device.

13. An apparatus for television conference as claimed in claim 12, wherein said lighting device is attached to the back face of said door by a supporting member which holds said lighting device in a position either parallel or perpendicular to said door.

14. An apparatus for television conference as claimed in claim 10, wherein said manuscript table comprises side face of a portion of said cabinet where said camera means is accommodated, and said cabinet has a handle member in a position where said manuscript table comes in contact with said handle member so as to hold said manuscript table in horizontal position where said object can be placed.

* * * * *